United States Patent
Eggers et al.

(10) Patent No.: US 6,270,882 B1
(45) Date of Patent: Aug. 7, 2001

(54) FLEXIBLE, MULTI-LAYER FILM HAVING ELEVATED STIFFNESS, DIMENSIONAL STABILITY AND FLEX CRACK RESISTANCE

(75) Inventors: Holger Eggers; Klaus Lund; Rainer Brandt; Bernd Sperlich, all of Walsrode (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/203,831

(22) Filed: Dec. 1, 1998

(30) Foreign Application Priority Data

Dec. 3, 1997 (DE) .............................. 197 53 507

(51) Int. Cl.$^7$ ...................................... B32B 7/02
(52) U.S. Cl. ...................... 428/213; 428/220; 428/476.3; 428/475.8; 428/476.1; 428/476.9
(58) Field of Search .................... 428/212, 332, 428/334, 339, 213, 220, 219, 476.3, 475.8, 476.1, 476.9

(56) References Cited

U.S. PATENT DOCUMENTS

| 4,678,713 | 7/1987 | Lancaster ............................. 428/421 |
| 4,965,314 | 10/1990 | Lancaster et al. ..................... 525/60 |
| 5,441,806 | * 8/1995 | Brandt et al. ......................... 428/349 |
| 5,567,489 | * 10/1996 | Allen et al. .......................... 428/34.1 |

FOREIGN PATENT DOCUMENTS

| 0 569 101 | 11/1993 | (EP) . |
| 0 669 374 | 8/1995 | (EP) . |
| 96/06889 | 3/1996 | (WO) . |
| 96/18686 | 6/1996 | (WO) . |

OTHER PUBLICATIONS

Maack Specialty Film '96, J.G. Bonner, A.K. Powell (Abstract only).

* cited by examiner

Primary Examiner—Cynthia H. Kelly
Assistant Examiner—B. Shewareged
(74) Attorney, Agent, or Firm—Joseph C. Gil; James R. Franks

(57) ABSTRACT

The present invention relates to a heat sealable, unoriented multi-layer film consisting of a sequence of layers (I) comprising one or more plies on the outer side of the film, a sequence of layers (II) also comprising at least one ply, denoted the heat sealable layer, on the other outer side of the film, optionally together with a coupling sequence of layers (III), also of one or more plies, between the sequences of layers (I) and (II), wherein the multi-layer film is characterized in that the sequence of layers (I) contains at least one layer (i) of a linear alternating copolymer (1) of carbon monoxide and at least one ethylenically unsaturated olefin, optionally together with one or more layers (ii) containing polyamide, characterised in that the ratio between the thicknesses of the sequence of layers (I) and the total multi-layer film is no greater than 0.6 and no less than 0.15, that the total thickness of the multi-layer film is no less than 50 and no more than 300 μm, and that at least one melting point, determined using the DSC method to ASTM 3418, of one of the polymeric components present in the sequence of layers (II) is at least 50° C. lower than at least one melting point, determined using the DSC method to ASTM 3418, of one of the polymers present in the sequence of layers (I).

39 Claims, No Drawings

FLEXIBLE, MULTI-LAYER FILM HAVING ELEVATED STIFFNESS, DIMENSIONAL STABILITY AND FLEX CRACK RESISTANCE

FIELD OF THE INVENTION

The present invention relates to a multi-layer heat sealable film which consists of a strength-imparting sequence of layers, a heat sealable layer, optionally together with a bonding layer located between them. The strength-imparting sequence of layers may itself comprise one or more plies and contains a layer of a linear copolymer of an alternating structure prepared from carbon monoxide and at least one ethylenically unsaturated olefin, which layer may optionally be coextruded with layers containing polyamide. The heat sealable layer may also comprise multiple plies. Since the multi-layer film according to the invention retains elevated stiffness and dimensional stability even when exposed to heat and moisture, it is distinguished by outstanding machine processing characteristics in conventional packaging machinery. The film is additionally distinguished by very high flex crack resistance. The invention also concerns the use of the stated film on machinery for the production of tubular bags sealed on all sides and on machinery for the production of thermoformed tray packages and the use of the film for packaging foodstuffs. The film of the invention is halogen-free.

BACKGROUND OF THE INVENTION

The majority of packaging for foodstuffs, snacks and similar products is produced on form/fill/seal bagging machines. The mode of operation of such machines and the structure of films preferably processed on such machines is described, for example, in *The Wiley Encyclopedia of Packaging Technology* (editors M. Bakker, D. Eckroth; John Wiley & Sons, 1986) and in *Nentwig* (Joachim Nentwig, Kunststoff-Folien, Carl Hanser Verlag 1994, Munich).

Form/fill/seal bagging machines form a tube from a continuously fed film, introduce he contents therein and, once the film has subsequently been heat sealed on all sides around the contents, separate from the fed end of the tube a bag-shaped container, formed from a continuous section of film and filled with the product. The stated container is referred to below as a tubular bag. For reasons of economy, elevated machine running speeds are advantageous for the performance of these operations. Particular requirements are consequently placed upon the flexible packaging film used.

Moreover, in many cases the contents requires the least possible exchange of the atmosphere present in the package with the ambient air around the package. Thus, for example, in the case of oxygen-sensitive contents, the interior of the package may be provided with an oxygen-depleted atmosphere. The penetration of water vapour may, however, also be disadvantageous in the case of moisture-sensitive goods. In order to maintain the desired atmospheric conditions the packaging film must accordingly, on the one hand provide an elevated diffusion barrier to such unwanted gases while, on the other, have no macroscopic leaks, such as pores, which allow convective air flow into or out of the package.

One essential precondition for elevated packaging speeds on form/fill/seal bagging machines is elevated stiffness of the film used. The modulus of elasticity to DIN EN ISO 527 may be used as a suitable measure of the stiffness of a film. Elevated stiffness is required in order to draw it through the machinery with the least possible deformation despite the elevated forces applied thereto. Thus, for example, deformation of the film in the area to be heat sealed results in irregularities in the sealed seams. Apart from impairing the appearance of the film, this may, under certain circumstances, also result in leakage, for example if creases are included in the heat seal and consequently in a failure of the function of the package formed from the film.

Particular requirements with regard to the thermal softening behaviour of the film apply to so-called horizontal form/fill/seal bagging machines, which heat seal the film in the machine direction by means of a heated, driven pair of rotating rollers, through which the areas of the film to be sealed are passed. Before reaching the heat sealing rollers, the film is appropriately preheated. In the zone between preheating and heat sealing, the film is in a thermally softened state and thus has a particular tendency to be introduced irregularly into the heat sealing rollers, so giving rise to irregular seams. Optimum processability of the film entails a heat sealable layer which melts at low temperatures combined with a supporting layer which is as stiff and dimensionally stable as possible at elevated temperatures.

If the stated machines are shut down temporarily, the sections of film already unwound from the feed roll remain in extended contact with the ambient atmosphere. In many cases, especially if the prevailing climatic conditions are hot and moist, certain films may absorb moisture from the ambient air and not only soften but also, under certain circumstances, curl due to the non-uniform increase in volume of the inner and outer layers, or they may shrink or expand due to moisture absorption or undergo an accompanying structural change, such as post-crystallisation. These changes may have such a serious effect on the functioning of the packaging machine that it is impossible subsequently to process the exposed areas of film after such shut-downs. Film curling may be qualitatively assessed using the measurement method specified in relation to the characterisation of the Examples according to the invention.

For transport purposes the bags produced in the manner described above are conventionally consolidated in a transport package containing a large number of packages. A typical example of such a transport package is a carton made from paperboard. Placing the packages in the transport package and transport itself expose the packaging film to elevated stresses.

This frequently results in the formation of creases and folds in the packages. Vibration during introduction into the transport package and during transport repeatedly exposes the film to forces which are transferred by mechanical impact against the inside of the transport package or, within the transport package, against adjacent packages. Such contact results in particular stress in the area of a fold. This may thus result, after a certain number of such impacts, in local failure of the film at the fold. This gives rise to a pore which, by allowing air exchange and consequent spoilage of the contents, may result in failure of the package. The resistance of a film to such stress will be referred to below as flex crack resistance, which may, for example, be quantified by the measurement method specified in relation to the characterisation of the Examples according to the invention.

For the prior art film structures described below, it is generally the case that, at an identical film thickness, increased stiffness of the film due to appropriate selection of one of the stated materials, or, with an identical material, increased film thickness, both result in reduced flex crack resistance thereof.

For these reasons, the stated packages are conventionally produced using multi-layer films having a layer or sequence of layers which ensures film stability and is conventionally located on the outer side of the film, here denoted the support film, followed by a layer, the primary function of which is to provide adequate adhesion to the single or multi-layer sequence of layers located on the inner side, here denoted in brief as the heat sealable layer.

The thickest possible heat sealable layer is advantageous in order to ensure that sealing of the package is effective around creases too. A thick support film also contributes towards elevated mechanical stability of the film. On the other hand, on economic grounds (firstly due to material costs and secondly due to the required elevated machine running speeds), the films should be as thin as possible. An excessively thick support film furthermore has a particular tendency to fail by flex cracking. Depending upon package size and contents, favourable thickness ratios for flexible films in tubular bag films are around 15 to 25 μm for the support film and 40 to 70 μm for the heat sealable layer.

Unless otherwise stated, the polymers present in the individual layers are described using the abbreviations for plastics to DIN 7728 or ISO 1043-1987 (E).

Melting points are stated below in relation to the value determined to ASTM 3418 using DSC (differential scanning calorimetry) analysis.

In multi-layer structures, the sequence of layers is described by a succession of the abbreviations of the polymers for the corresponding layers separated from each other by oblique slashes. The heat sealable layer is always on the right.

Oriented polymers are preferably used as the support film for packaging oxygen-sensitive goods on form/fill/seal bagging machines, such as polyamide (PA) oriented biaxially or monoaxially in machine direction or biaxially oriented polyethylene terephthalate (PET). The polyamide used is predominantly PA6, i. e. polycaprolactam, but other grades of PA are also used, such as for example PA-MXD6, a polymer of m-xylylenediamine and adipic acid. "Polyamide" is taken to mean in the widest possible sense polymeric compounds which are linked by the acid amide group —NH.CO—(c.f. also Kunststoff-Handbuch, volume VI, *Polyamide*, Carl Hanser Verlag, Munich, 1966). A distinction is made between two groups of polyamides: those synthesised from one monomer by polycondensation of ω-aminocarboxylic acids or polymerisation of the lactams thereof to yield the polyamide 6 type and those produced from two monomers (diamines and dicarboxylic acids) by polycondensation to yield the polyamide 66 type (Gnauck, Fründt, *Einstieg in die Kunststoffchemie*, Carl Hanser Verlag, Munich, 1991). Polyamides are distinguished by numbers which state the number of C atoms in the starting substance or, in the case of two components, in the diamine (first number) and in the dicarboxylic acid (second number) or by an abbreviation describing the diamine or the dicarboxylic acid (for example PA MXD6 prepared from the diamine m-xylylenediamine and the dicarboxylic acid adipic acid).

| Abbreviation | ω-Aminocarboxylic acid or lactams | Diamine | Dicarboxylic acid |
|---|---|---|---|
| PA 6 | ε-caprolactam | — | — |
| PA 11 | 11-aminoundecanoic acid | — | — |
| PA 12 | ε-laurolactam | — | — |
| PA 66 | — | hexamethylenediamine | adipic acid |

-continued

| Abbreviation | ω-Aminocarboxylic acid or lactams | Diamine | Dicarboxylic acid |
|---|---|---|---|
| PA 610 | — | hexamethylenediamine | sebacic acid |
| PA 6I | — | hexamethylenediamine | isophthalic acid |
| PA MXD6 | — | m-xylylenediamine | adipic acid |
| PA 6/66 | ε-caprolactam | hexamethylenediamine | adipic acid |
| PA 6/6T | ε-caprolactam | hexamethylenediamine | terephthalic acid |
| PA 6I/6T | — | hexamethylenediamine | isophthalic acid & terephthalic acid |
| PA 6/6I | ε-caprolactam | hexamethylenediamine | isophthalic acid |
| PA 6/66 | ε-caprolactam & ε-laurolactam | — | — |

Table explaining polyamide nomenclature

In addition, polymers are used in the support film which exhibit adequate stiffness even without orientation. Ethylene/vinyl alcohol copolymers (EVOH) are in particular here used in conjunction with polyamide, wherein the support film in these cases preferably comprises EVOH coextruded between two PA layers, i.e. the structure PA/EVOH/PA, and the EVOH preferably contains 40 to 85 mol. % vinyl acetate with a minimum degree of saponification of 90%. Apart from the pure materials, blends, for example of PA-MXD6 with PA6, are also used.

In the simplest case, the heat sealable layer consists of a single layer. This layer preferably consists of polyolefins, such as for example polyethylene (LDPE, HDPE) or ethylene/α-olefin copolymers (LLDPE), produced with conventional Zielger/Natta catalysts or with metallocene catalysts, or of polymers derived from olefins, such as for example ethylene/vinyl acetate copolymers (EVA), ethylene copolymers with unsaturated esters (for example EBA), ethylene copolymers with unsaturated carboxylic acids (for example EAA, EMAA) and ionomers. Blends of the stated classes of substances are also conventional in order to achieve desired combinations of properties. Low density (less than 0.915 g/cm$^3$) ethylene/α-olefin copolymers produced using metallocene catalyst technology are in particular suitable as heat sealable layer materials due to the low sealing activation temperature and elevated hot tack thereof.

It is also prior art to provide a multi-layer heat sealable layer. For example in order to optimise costs, the above-stated substances may be arranged in such a manner that the layer on the inner side of the film facing towards the product is distinguished by a particularly rapid onset of sealing and the subsequent layer used for the film core, while not melting until higher temperatures is consequently lower in cost or, due to a higher melt strength makes it possible to produce such a heat sealable layer as a blown film. Coupling polymers from the stated classes of substances or polymers produced on the basis thereof, such as those modified by grafting with anhydride, may optionally also be used. Examples of such structures are the sequences of layers LDPE/EVA or LDPE/EAA/ionomer.

The support film and heat sealable layer are conventionally bonded together by a coupling layer. There is a possibility here of coextruding all the layers of the film together, i.e. bringing together the polymers of these layers as molten streams and allowing them to flow in molten form through a common die. An extrudable coupling agent for bonding the support film to the heat sealable layer is required for this process. Suitable prior art coupling agents are, for example, maleic anhydride-modified polymers from the group comprising LDPE, LLDPE and EVA, but an EAA or EMAA may also be used as a coupling agent.

Films of identical structure may, however, also be produced by extrusion coating, i.e. by application of the heat sealable layer in a molten state onto a previously produced support film, which has already been provided on the side to be coated with the coextruded coupling agent or a primer applied after extrusion.

If the support film and heat sealable layer have previously been produced separately, they may be bonded according to the prior art by using a laminating adhesive. Such adhesives are conventionally long-chain isocyanates and polyols mixed immediately prior to application, which, once applied, cure to yield polyurethanes.

Such coating or lamination may here be performed on the same production machinery on which the support film is also manufactured. This is generally more economically advantageous than previously producing a support film on a separate machine. Where oriented support films are used, however, it is not advantageous to perform such further processing on the machine used for the production of the support film.

In addition to the above-stated polymers, the class of substances comprising aliphatic polyketones has also been known for quite some time. These are strictly linear and alternating polymers of carbon monoxide and at least one ethylenically unsaturated olefin. However, only few applications for the production of films are known for these materials. Known applications solely exploit the good oxygen barrier properties or high frequency heatability of these materials.

In a presentation to *Maack Specialty Film '96*, J. G. Bonner and A. K. Powell describe a five-layer structure PP/coupling agent/aliphatic polyketone/coupling agent/PP as a film heat sealable on both sides for packaging foodstuffs. This structure is essentially distinguished by the good oxygen barrier thereof. It is, however, fundamentally unsuitable for use on high speed form/fill/seal bagging machines due to the symmetrical structure and high-melting heat sealing materials thereof. WO 8607012 describes a multi-layer laminate comprising at least two different extrudable polymers, wherein at least one ply contains a polyketone, preferably an ethylene/carbon monoxide copolymer, and is bonded to another layer, preferably consisting of a halopolymer. This film is particularly suitable for sealing by high frequency electromagnetic waves. While the halopolymers, such as PVC or PVDC, used in the stated structure may indeed be heated with radio frequency waves, due to foodstuffs legislation and environmental concerns, they are not advantageous for packaging foodstuffs.

U.S. Pat. No. 5,232,786 describes a multi-layer coextruded structure comprising at least one aliphatic polyketone and at least one polyamide, polyvinyl chloride or copolyether-ester. These structures are distinguished by low adhesion of the composite. This property, combined with the deficient heat sealing characteristics of such a composite, would apparently make it unsuitable for use as a highly stressed tubular bag film. U.S. Pat. No. 5,077,385 describes a two layer laminate, in which one of the layers consists of an aliphatic polyketone, preferably a terpolymer of carbon monoxide, ethylene and propylene, and the other layer is formed by a polypropylene or polycarbonate. The essential feature of the disclosed laminate is the production of the polyketone from a melt by cooling at a rate of 1° C. to 20° C. per minute. In this manner, the material achieves good barrier properties for water vapour, oxygen and carbon dioxide. Implementation of such a cooling process in machines for producing a film suitable for processing as a tubular bag would result in extremely long machine residence times and thus in very costly films. The stated multi-layer structure is furthermore not suitable for a rapid sealing film.

Polymer blends based on aliphatic polyketones have also been disclosed in the patent literature. WO 09111470 accordingly describes a homogeneous blend of an ethylene/vinyl alcohol copolymer and a copolymer of ethylene and carbon monoxide. The blend is distinguished by good oxygen barrier properties, heatability by high frequency radiation and, in comparison with the pure copolymer of ethylene and carbon monoxide, improved melt strength and is accordingly used inter alia for processing as a blown film. Such a polymer blend and the use thereof in single or multi-layer films is also described in U.S. Pat. No. 4,965,314. In addition to the above-stated advantages of high frequency heatability and good oxygen barrier properties, a film based on such a polymer blend is additionally distinguished by improved puncture resistance.

WO 09606889 and EP 00669374 also disclose blends of an aliphatic polyketone with a linear low density polyethylene (LLDPE) or a high density polyethylene (HDPE), which are distinguished by improved barrier properties not only for oxygen but also for water vapour and hydrocarbons. Containers and films suitable for receiving foodstuffs produced from these materials are thus also claimed. Since aliphatic polyketones combined with LLDPE or HDPE soften earlier when exposed to heat than the pure copolymer of ethylene and carbon monoxide, such blends are not appropriate for the present application.

The object arose of providing an unoriented multi-layer film having good machine processing characteristics for the production of tubular bags on typical packaging machinery combined with elevated flex crack resistance. If good machine processing characteristics are to be achieved, the film must be rapidly heat sealable on one side when exposed to heat, but must nevertheless have elevated overall stiffness and flatness, even when exposed to heat and moisture. It should also be possible to produce the film efficiently and simply with the fewest possible operations and the film should thus contain no oriented components. The film of the invention is halogen-free.

SUMMARY OF THE INVENTION

This has been achieved according to the invention by the provision of a heat sealable, unoriented multi-layer film consisting of a sequence of layers (I) comprising one or more plies on the outer side of the film, a sequence of layers (II) also comprising at least one ply, denoted the heat sealable layer, on the other outer side of the film, optionally together with a coupling sequence of layers (III), also of one or more plies, between the sequences of layers (I) and (II), wherein the multi-layer film is characterised in that the sequence of layers (I) contains at least one layer (i) of a linear alternating copolymer (1) of carbon monoxide and at least one ethylenically unsaturated olefin, optionally together with one or more layers (ii) containing polyamide, that the ratio between the thicknesses of the sequence of layers (I) and the total multi-layer film is no greater than 0.6 and no less than 0.15, that the total thickness of the multi-layer film is no less than 50 and no more than 300 $\mu$m, and that at least one melting point, determined using the DSC method to ASTM 3418, of one of the polymeric components present in the sequence of layers (II) is at least 50° C. lower than at least one melting point, determined using the DSC method to ASTM 3418, of one of the polymers present in the sequence of layers (I).

DETAILED DESCRIPTION OF THE INVENTION

The multi-layer film according to the invention is particularly preferably of a structure such that the ratio between the thicknesses of the sequence of layers (I) and of the total multi-layer film according to the invention is no greater than 0.4 and no less than 0.2.

In a particularly preferred embodiment, the total thickness of the multi-layer film according to the invention is no less than 60 and no more than 250 $\mu$m.

In one possible embodiment of the multi-layer film according to the invention, one or both of the sequences of layers (I) and (II) is printed.

In the simplest case, the sequence of layers (I) of the film according to the invention comprises only one layer (i) of the linear alternating copolymer (1) of carbon monoxide and at least one ethylenically unsaturated olefin. The sequence of layers (I) may, however, also comprise multiple plies in order to improve lamination and printing properties. In these cases, in addition to one or more layers (i) which contain a copolymer (1), (I) preferably also contains at least one layer (ii) containing polyamide. Particularly preferably, (I) contains only one layer (i) containing a linear alternating copolymer (1) of carbon monoxide and at least one ethylenically unsaturated olefin, which is bounded on both sides by layers (ii) containing polyamide. In a more particularly preferred embodiment, each side of layer (i) is bounded by only one layer (ii) containing polyamide. In a still more particularly preferred embodiment, the layers (ii) on both sides of layer (i) are identical with regard to material composition and thickness.

In a preferred embodiment of the sequence of layers (I) comprising multiple plies, (I) is produced by coextrusion.

The linear alternating copolymer (1) of carbon monoxide and at least one ethylenically unsaturated olefin present in at least one layer (i) preferably consists of carbon monoxide and one or more olefins from the group comprising ethylene and $C_3$ to $C_{10}$ alkenes, such as for example propylene, 1-butene, 2-butene, 1-pentene, 1-hexene, 1-octene, 1-nonene, 1-decene. (1) is particularly preferably a terpolymer of carbon monoxide, ethylene and propylene and in a particularly preferred embodiment such a terpolymer of carbon monoxide, ethylene and propylene having a random distribution along the polymer chain of monomer units ethylene (A) and propylene (B), in which the stoichiometric ratio B/A of these monomeric units is no more than 0.5.

Such a layer (i) may additionally also contain further thermoplastic polymers as blend components. Ethylene/vinyl alcohols copolymers and/or polyamide are in particular suitable for this purpose. The copolymer (1) may also contain non-polymeric additives. Examples of these are anti-static agents, lubricants, anti-blocking agents, pigments or other solid fillers of any kind.

The layers (ii) containing polyamide preferably contain polyamide 6, polyamide 10, polyamide 12, polyamide 66, polyamide 610, polyamide 6I, polyamide 6/12, polyamide 6/66, polyamide 6I/6T, polyamide MXD6, polyamide 6/6I, polyamide 6/6T or blends thereof. Blends of the stated polyamides containing at least 80 wt. % polyamide 6, relative to the total weight of the blend, are particularly preferably used.

The layers (ii) containing polyamide of the film according to the invention may additionally also contain conventional additives such as lubricants, pigments or other solid fillers of any kind. Solid inorganic or organic particles of a size of below 1 $\mu$m are particularly suitable for controlling the stiffness and oxygen permeability of the polyamide layers (ii).

The heat sealable layer (II) preferably consists of the polymers conventionally used as a sealing medium. These are, for example, polyethylene (LDPE and HDPE) or polypropylene (PP). Ethylene/$\alpha$-olefin copolymers (LLDPE) may also be used. They may be produced either with conventional Ziegler/Natta catalysts or with metallocene catalysts. The latter exhibit the major advantage for the application described above of a low crystallite melting point. Other copolymers of ethylene may also be used, such as ethylene/propylene copolymers, ethylene/vinyl acetate copolymers (EVA), ethylene copolymers with unsaturated esters (EBA), ethylene copolymers with unsaturated carboxylic acids (EAA, EMAA) and ionomers.

The above-stated polymers used in the heat sealable layers may also be used as blends with each other in order to achieve particular characteristics.

The film according to the invention may also contain a heat sealable layer (II) comprising multiple layers. In such an embodiment, the individual plies of the heat sealable layer (II) are preferably arranged in such a manner that the layer (iii) located on the inner side of the film facing towards the product contains polymers having a lower melting point than the subsequent sequence of layers (iv) inward towards the film core of the heat sealable layer (II). In another preferred form of a multi-layer embodiment of the heat sealable layer (II), the heat sealable layer may additionally contain one or more coupling plies (v) between the actual, rapidly melting heat sealable ply (iii) and the sequence of layers (iv) located inward towards the film core of the heat sealable layer (II). In such cases, the sequence of layers (II) is preferably produced by coextrusion, i.e. the polymers of all the layers (iii), (iv) and (v) are brought together as molten streams and flow in molten form through a common die. In this process, the sequence of layers (II) preferably has the structure (iv)/(v)/(iii) or (iv)/(iii). The layer (v) present in the three-layer version here contains an extrudable coupling agent (2). Modified polyolefins are preferably used for this purpose. These are preferably polyolefins having carboxyl groups, such as for example polyethylene, polypropylene, ethylene/$\alpha$-olefin copolymers or ethylene/vinyl acetate copolymers. These are grafted with at least one monomer from the group of $\alpha,\beta$-monounsaturated dicarboxylic acids, such as for example maleic acid, fumaric acid, itaconic acid or the acid anhydrides, acid esters, acid amides and acid imides thereof. Further extrudable coupling agents (2) which may be used are copolymers of ethylene with $\alpha$, $\beta$-monounsaturated dicarboxylic acids, such as acrylic acid, methacrylic acid and/or the metal salts thereof with zinc or sodium and/or the alkyl ($C_1$–$C_4$) esters thereof or corresponding graft polymers on polyolefins, such as for example polyethylene, polypropylene or ethylene/$\alpha$-olefin copolymers graft polymerised with a monomer of the stated unsaturated acids. Of these, polyolefins such as ethylene/$\alpha$-olefin copolymers with grafted $\alpha,\beta$-monounsaturated dicarboxylic anhydride, in particular maleic anhydride, are particularly preferred.

The polymers in the sequence of layers (II) are preferably selected such that at least one melting point, determined using the DSC method to ASTM 3418, of one of the polymeric components present in the sequence of layers (II) is preferably at least 80° C. particularly preferably at least 100° C. lower than at least one melting point, determined using the DSC method to ASTM 3418, of one of the polymers present in the sequence of layers (I).

All the plies or each individual ply of the sequence of layers (II) may additionally be provided with additives which improve the functionality of the film. Examples are solid inorganic particles known as anti-blocking agents, which protrude from the outer surface of the heat sealable layer and thus improve the surface slip behaviour of the film. Silicon oxide, calcium carbonate, magnesium silicate, aluminium silicate, calcium phosphate and the like are suitable for this purpose. Effective quantities are in the range from 0.1 to 2 wt. %, preferably from 0.1 to 0.8 wt. %. Average particle size is between 1 and 10 μm, preferably between 2 and 7 μm, wherein particles of a spherical form are particularly suitable. In multi-ply heat sealable layers, these particles are preferably used only in the outer layer (iii).

Other additives which improve the surface slip of the film, also in conjunction with the stated solid particles, and are preferably present in one of the plies of the sequence of layers (II), are the higher aliphatic acid amides, higher aliphatic acid esters, waxes, metal soaps and polydimethylsiloxanes conventionally known as lubricants. The effective quantity of lubricant is within the range from 0.01 to 3 wt. %, preferably from 0.02 to 1 wt. %. Addition of higher aliphatic acid amides in the range from 0.01 to 0.25 wt. % is particularly suitable. One particularly suitable aliphatic acid amide is erucamide.

The sequences of layers (I) and (II) are preferably bonded together by a single or multi-layer coupling sequence of layers (III). There is a possibility here of coextruding all the sequences of layers (I), (II) and (III) together, i.e. bringing together the polymers of all the layers as molten streams and allowing them to flow in molten form through a common die. In this process, the sequence of layers (III) is preferably of a single ply and contains a coextrudable coupling agent (3). Modified polyolefins are preferably used for this purpose. These are preferably polyolefins having carboxyl groups, such as for example polyethylene, polypropylene, ethylene/α-olefin copolymers or ethylene/vinyl acetate copolymers. These are grafted with at least one monomer from the group of α,β-monounsaturated dicarboxylic acids, such as for example maleic acid, fumaric acid, itaconic acid or the acid anhydrides, acid esters, acid amides and acid imides thereof. Further extrudable coupling agents (3) which may be used are copolymers of ethylene with α,β-monounsaturated dicarboxylic acids, such as acrylic acid, methacrylic acid and/or the metal salts thereof with zinc or sodium and/or the alkyl ($C_1$–$C_4$) esters thereof or corresponding graft polymers on polyolefins, such as for example polyethylene, polypropylene or ethylene/α-olefin copolymers grafted with a monomer of the stated unsaturated acids. Of these, polyolefins such as ethylene/α-olefin copolymers with grafted α, β-monounsaturated dicarboxylic anhydride, in particular maleic anhydride, are particularly preferred.

In one embodiment of the film according to the invention, in which the sequence of layers (I) contains no layers (ii) containing polyamide and the sequence of layers (III) is of a single ply, the extrudable coupling agent (3) may also be a polymer from the group of linear alternating copolymers of carbon monoxide and at least one ethylenically unsaturated olefin, preferably a copolymer of carbon monoxide and one or more olefins from the group comprising ethylene and $C_3$ to $C_{10}$ alkenes, such as for example propylene, 1-butene, 2-butene, 1-pentene, 1-hexene, 1-octene, 1-nonene, 1-decene, particularly preferably a terpolymer of carbon monoxide, ethylene and propylene and in a particularly preferred embodiment such a terpolymer of carbon monoxide, ethylene and propylene having a random distribution along the polymer chain of monomer units ethylene (A) and propylene (B), in which the stoichiometric ratio B/A of these monomeric units in this particularly preferred embodiment is greater than the ratio B/A of the monomeric units in copolymer (1) of the layer (i) adjacent to the single ply sequence of layers (III).

The film according to the invention may also be produced by extrusion coating, i.e. by application of the sequence of layers (II) and optionally (III) in a molten state onto the previously produced sequences of layers (I) and optionally (III).

The film according to the invention may additionally be produced by separate prior production of the sequences of layers (I) and (II). In such cases, the coupling sequence of layers (III) used is a single-ply layer of a laminating adhesive (4) to be applied, for example, with a roller applicator, either onto the support film or onto the heat sealable layer. Such adhesives (4) are conventionally systems based on acrylates, polyurethanes or polyesterurethanes.

By using the sequence of layers according to the invention, it is surprisingly possible to provide an unoriented film which has elevated stiffness simultaneously combined with elevated flex crack resistance. It was not to have been expected that, apart from these properties, the film would additionally be distinguished from prior art films by lower softening when exposed to heat or moisture and by distinctly lower curling under the influence of moisture.

The film is accordingly in particular suitable for the exposure to heat occurring at the sealing station in horizontal form/fill/seal bagging machines at elevated machine speeds and for further use in the form of a tubular bag subjected to mechanical stress. The film is additionally distinguished by wide processing latitude under various climatic conditions. The film is considerably less sensitive to machine shutdowns than prior art films.

The unoriented film according to the invention is surprisingly also highly suited to use on thermoform/fill/seal machines by virtue of the thermoformability thereof and the better combination of stiffness and flex crack resistance in comparison with corresponding prior art films and the distinctly lower sensitivity to the hot and moist climatic conditions frequently prevailing in packaging plant and the associated lower tendency to curling and softening.

The present invention accordingly also provides the use of the film for the production of bags on form/fill/seal machines and as a tray or lid film in thermoform/form/fill/seal machines.

The film may be produced efficiently, production in a single operation being possible. In particular, the necessary stiffness may be achieved without any necessity for separate prior production of a support film and the mono- or biaxial orientation thereof.

The following Examples illustrate the subject matter of the invention in greater detail:

EXAMPLES

Example 1

A linear alternating terpolymer of carbon monoxide together with ethylene and 5 wt. % propylene, relative to the total weight of the polymer, having a melting point of 220° C. was melted in a conventional three-zone extruder and adjusted to a temperature of 250° C. The terpolymer has a melt flow index (MFR), measured to ISO 1133 at 240° C. and 2.16 kg, of 5 g/10 min. The molten terpolymer was then drawn off as a flat film of a thickness of 20 μm by being continuously applied through a slot die, likewise adjusted to a temperature of 250° C., onto a rotating casting roll having a surface temperature of 100° C. The resultant film was then cooled to room temperature, reheated to 60° C. and, in this state, roller coated to a weight per unit area of 2 g/m² with a solvent-free adhesive consisting of a polyol and a diisocyanate in a stoichiometric ratio suitable for crosslinking to yield a polyurethane. Another film produced in a preceding operation, the heat sealable layer, was then brought into contact with the adhesive coated side of this film, the support film, such that the two films could be joined together under pressure, again at 60° C., in a roller nip. The heat sealable layer was 50 µm thick and consisted of an ethylene/octene copolymer (LLDPE) produced using metallocene catalysts and having a density of 0.902 g/cm³ and a melting point of 100° C. and an MFR of 1 g/10 min at 190° C. and 2.16 kg.

Example 2

The terpolymer of carbon monoxide, ethylene and propylene stated in Example 1 was melted in an extruder and heated to a temperature of 250° C. An ethylene/butene copolymer (LLDPE) modified by grafting with maleic anhydride as coupling agent having a density of 0.910 g/cm³ and an MFR of 4.4 g/10 min at 190° C. and 2.16 kg and a melting point of 124° C., an LDPE having a density of 0.920 g/cm³, a melting point of 108° C. and an MFR of 1 g/10 min at 190C. and 2.16 kg and finally an EVA having a content by weight of vinyl acetate of 5%, relative to the total weight of the polymer, a melting point of 101° C. and an MFR of 2 g/10 min at 190° C. and 2.16 kg were each separately melted in further extruders and heated to a temperature of 250° C. The four melt streams were then brought together in a common annular die and extruded to yield a tubular film. The film bubble was then further processed using the methods conventional in film blowing technology to yield a flat film. The film accordingly has the sequence of layers polyketone/coupling agent/LDPE/EVA, wherein the thicknesses are, in the stated order, 20, 8, 27 and 15 µm.

Example 3

The terpolymer of carbon monoxide, ethylene and propylene stated in Example 1 and the coupling agent stated in Example 2 were coextruded at 250° C. through a flat die and processed in the manner described in Example 1 to yield a flat support film. The terpolymer here has a thickness of 20 µm and the coupling agent layer a thickness of 8 µm. In a further-processing stage, the side of the support film provided with the coupling agent was coated in a roller nip to a thickness of 42 µm with a molten EVA having a content by weight of vinyl acetate of 5%, relative to the total weight of the polymer, a melting point of 101° C. and an MFR of 7 g/10 min at 190° C. and 2.16 kg. The temperature of the EVA during this operation is 280° C.

Comparative Example 4

Polyamide 6 having a crystallite melting point of 220° C. and a relative viscosity of 3.6 in 98% sulfuric acid was extruded in the manner described in Example 1 to yield a support film, also of a thickness of 20 µm and further processed, again in the manner described therein to yield a laminate with the same heat sealable layer as in Example 1.

Comparative Example 5

A support film having the sequence of layers PA/EVOH/PA of thicknesses 12, 6 and 12 µm is produced by flat film coextrusion in accordance with the method stated in Example 3. The polyamide used is the polyamide 6 from Comparative Example 4, the EVOH a copolymer of monomeric units of ethylene and vinyl alcohol, wherein the content by weight of the ethylene relative to the total polymer is 38 mol. % and the EVOH has a melting point of 173° C. and an MFR of 3.2 g/10 min at 210° C. and 2.16 kg. The support film produced in this manner is further processed in the manner described in Example 1 to yield a laminate having the same heat sealable layer as in Example 1.

Comparative Example 6

A previously produced support film of oriented polyamide 6 of a gauge of 15 µm was laminated using the process from Example 1 against the heat sealable layer also stated in Example 1.

The following physical characteristics were measured on the specimens as follows:

modulus of elasticity to DIN EN ISO 527 at a) a temperature of 23° C. and a relative humidity of 0% and b) a temperature of 90° C. and a relative humidity of 0% and c) a temperature of 23° C. and a relative humidity of 50%. The various climatic conditions here approximately correspond to the conditions to which a film is exposed a) immediately after unwinding from the reel, b) after preheating in the heat sealing station of a horizontal form/fill/seal bagging machine and c) after extended shut-down of the machine.

flex crack resistance at a temperature of 23° C. and a relative humidity of 50% by rolling a cut sample into a single ply cylinder of a length of 198 mm and a circumference of 280° C. and clamping it on both sides in appropriately shaped holders. The free length of the cylinder formed from the film between the holders is 192 mm. While simultaneously being rotated by 440° around the axis of symmetry describing the cylinder, the holders are brought together to a distance of 40 mm for a given number of cycles and a frequency of 35cycles per minute. The films to be tested are previously kept for 7 days under climatic conditions of 23° C. and 50% relative humidity. The number of flex cracks occurring on the film in this manner after the pre-set number of strokes may be determined by wetting the film on one side with ammonia solution while the other side of the film is simultaneously in contact with a sheet of blueprint paper. The number of blue-black stains on the blueprint paper caused by ammonia discernible after 15 minutes is deemed to be the number of flex cracks in the tested section of film. The value is obtained as an average of the individual values from two test specimens.

the curling tendency of the film under climatic conditions of 23° C. and 50% relative humidity by freely suspending from one narrow side a 15 mm×100 mm long specimen taken from the longitudinal direction of the film. The curling tendency in both the longitudinal and transverse direction is graded after one hour using the following criteria. The poorest rating in the longitudinal or transverse direction is used as the overall assessment.

no or scarcely discernible curling: + clearly visible curling without the film coming into contact with itself at any point: 0 severe curling such that the film comes into contact with itself at at least one point: −

The following table summarises the results:

| Film from | Orientation required? | Tendency to curl 23° C., 50% r.h. | Modulus of elasticity [MPa] in longitudinal direction | | | Number of flex cracks after | |
|---|---|---|---|---|---|---|---|
| | | | 23° C., 0% r.h. | 90° C., 0% r.h. | 23° C., 50% r.h. | 350 strokes | 500 strokes |
| Example 1 | no | + | 543 | 170 | 521 | 1.5 | 2.5 |
| Example 2 | no | + | 559 | 179 | 536 | 2 | 4 |
| Example 3 | no | + | 525 | 167 | 502 | 1 | 3.5 |
| Comparative Example 4 | no | − | 501 | 124 | 291 | 3 | 6 |
| Comparative Example 5 | no | − | 773 | 194 | 544 | 5 | 12.5 |
| Comparative Example 6 | yes | − | 1526 | 471 | 785 | 0.5 | 1 |

What is claimed is:

1. A heat sealable, unoriented multi-layer film consisting of a sequence of layers (I) comprising one or more plies on the outer side of the film, a sequence of layers (II) also comprising at least one ply, denoted the heat sealable layer, on the other outer side of the film, optionally together with a coupling sequence of layers (III), also of one or more plies, between the sequences of layers (I) and (II), wherein the multi-layer film is characterised in that the sequence of layers (I) contains at least one layer (i) of a linear alternating copolymer of carbon monoxide and at least one ethylenically unsaturated olefin, optionally together with one or more layers (ii) containing polyamide, characterised in that the ratio between the thicknesses of the sequence of layers (I) and the total multi-layer film is no greater than 0.6 and no less than 0.15, that the total thickness of the multi-layer film is no less than 50 and no more than 300 μm, and that at least one melting point, determined using the DSC method to ASTM 34178, of one of the polymeric components present in the sequence of layers (II) is at least 50° C. lower than at least one melting point, determined using the DSC method to ASTM 3418, of one of the polymers present in the sequence of layers (I), said film characterized in that it is halogen-free.

2. The film of claim 1 having a copolymer of carbon monoxide and one or more olefins selected from the group consisting of ethylene and $C_3$ to $C_{10}$ alkenes.

3. The film of claim 2, wherein the copolymer is a terpolymer of carbon monoxide, ethylene and propylene.

4. The film of claim 3, wherein the terpolymer of carbon monoxide ethylene and propylene has a random distribution along the polymer chain of monomer units ethylene (A) and propylene (B), in which the stoichiometric ratio B/A of these monomeric units is no more than 0.5.

5. The film of claim 1, wherein the ratio between the thicknesses of the sequence of layers (I) and the total multi-layer film is no greater than 0.4 and no less than 0.2.

6. The film of claim 1, wherein the total thickness of the multi-layer film is no less than 60 and no more than 250 μm.

7. The film of claim 1, wherein at least one melting point, determined using the DSC method to ASTM 3418, of one of the polymeric components present in the sequence of layers (II) is at least 80° C. lower than at least one melting point, determine using the DSC method to ASTM 3418, of one of the polymers present in the sequence of layers (I).

8. The film of claim 1, wherein at least one melting point determined using the DSC method of ASTM 3418, of one of the polymeric components present in the sequence of layers (II) is at least 110° C. lower than at least one melting point, determined using the DSC method to ASTM 3418, of one of the polymers present in the sequence of layers (I).

9. The film of claim 1, wherein the sequence of layers (I) consists of only one layer (i) of the linear alternating copolymer of carbon monoxide and at least one ethylenically unsaturated olefin.

10. The film of claim 1, wherein the sequence of layers (I) consists of one or more layers (i) containing the copolymer and one or more layers (ii) containing polyamide.

11. The film of claim 10, wherein the sequence of layers (I) contains only one layer (i) containing the linear alternating copolymer of carbon monoxide and at least one ethylenically unsaturated olefin, which is bounded on both sides by layers (ii) containing polyamide.

12. The film of claim 11, wherein each side of layer (i) is bounded by only one layer (ii) containing polyamide.

13. The film of claim 10, wherein the sequence of layers (I) is produced by coextrusion.

14. The film of claim 10 wherein polyamide is at least one member selected from the group consisting of polyamide 6, polyamide 10, polyamide 12, polyamide 66, polyamide 610, polyamide 6I, polyamide 6/12, polyamide 6/66, polyamide 6I/6T, polyamide MXD6, polyamide 6/6I and polyamide 6/6T.

15. The film of claim 14, wherein polyamide is a blend containing at least 80 wt. % polyamide 6, relative to the total weight of the blend.

16. The film of claim 1, wherein said layer (i) is a blend containing 50 to 100 parts by weight of the linear alternating copolymer of carbon monoxide and at least one ethylenically unsaturated olefin, and 0 to 50 parts by weight of a polyamide or an ethylene/vinyl alcohol copolymer.

17. The film of claim 16, wherein the blend contains 80 to 100 parts by weight of the linear alternating copolymer of carbon monoxide and at least one ethylenically unsaturated olefin, and 0 to 20 parts by weight of said polyamide.

18. The film of claim 17, wherein the polyamide is polyamide 6.

19. The film of claim 1, wherein the coupling sequence of layers (III) contains polyethylene, polypropylene or ethylene/α-olefin copolymer or an ethylene/vinyl acetate copolymer, which is grafted with at least one monomer from the group of maleic acid, fumaric acid, itaconic acid or the acid anhydrides, acid esters, acid amides and acid imides thereof, and/or copolymers of ethylene with acrylic acid, methacrylic acid and/or the metal salts thereof with zinc or sodium and/or the alkyl ($C_1$–$C_4$) esters thereof, or corresponding graft polymers on polyethylene, polypropylene or ethylene/α-olefin copolymers which are graft polymerised with a monomer from the group of maleic acid, fumaric acid, itaconic acid or the acid anhydrides, acid esters, acid amides and acid imides thereof.

20. The film of claim 19, wherein the sequence of layers (III) comprises only one layer.

21. The film of claim 20, wherein the coupling layer (III) contains an ethylene/α-olefin copolymer having grafted α,β-monounsaturated dicarboxylic anhydride.

22. The film of claim 21, wherein the coupling layer (III) contains an ethylene/α-olefin copolymer having grafted maleic anhydride.

23. The film of claim 1, wherein the coupling sequence of layers (III) is of a single layer and contains a polymer from the group of linear alternating copolymers of carbon monoxide and at least one ethylenically unsaturated olefin.

24. The film of claim 23, wherein the copolymer is a terpolymer of carbon monoxide, ethylene and propylene.

25. The film of claim 1 containing a printed image.

26. The film of claim 1 wherein at least one ply of said heat sealable layer comprises at least one polymer selected from the group consisting of polyethylene, ethylene/alpha-olefin copolymer produced with conventional Ziegler/Natta catalysts or with metallocene catalysts, ethylene/propylene copolymer, ethylene/vinyl acetate copolymer, ethylene copolymer with unsaturated ester, copolymer of ethylene with (meth)acrylic acid, copolymer of ethylene with a zinc or sodium salt of a (meth)acrylic acid, copolymer of ethylene and $C_1$–$C_4$ alkyl ester of (meth)acrylic acid.

27. The film of claim 26 wherein said sealable layer further comprises at least one additive selected from the group consisting of silicon oxide, calcium carbonate, magnesium silicate aluminum silicate, calcium phosphate, higher aliphatic acid amide, higher aliphatic acid ester, wax, metal soap and polydimethylsiloxane.

28. The film of claim 26 wherein said sealable layer further comprises at least one grafted member selected from the group consisting of polyethylene, polypropylene, ethylene/alpha-olefin copolymer, ethylene/vinyl acetate copolymer and ethylene/(meth)acrylic acid copolymer, wherein graft is at least one monomer selected from the group consisting of anhydrides, esters, amides and imides of at leas one member selected from the group consisting of maleic acid, fumaric acid and itaconic acid.

29. The film of claim 1 wherein said coupling sequence of layers contains at least one grafted member selected from the group consisting of polyethylene, polypropylene and wherein graft is at least one member selected from the group consisting of anhydrides, esters, amides and imides of at least one member selected from the group consisting of maleic acid, fumaric acid and itaconic acid.

30. The film of claim 29 wherein said grafted member is at least one member selected from the group consisting of ethylene/alpha-olefin copolymer, ethylene/vinyl acetate copolymer, ethylene/(meth)acrylic acid copolymer, ethylene/zinc salt of (meth)acrylic acid, ethylene/sodium salt of (meth)acrylic acid and ethylene/($C_1$–$C_4$)alkyl (meth) acrylate copolymer.

31. The film of claim 29 wherein said grafted member is at least one member selected from the group consisting of propylene/alpha-olefin copolymer, propylene/vinyl acetate copolymer, propylene/(meth)acrylic acid copolymer, propylene/zinc salt of (meth)acrylic acid, propylene/sodium salt of (meth)acrylic acid and propylene/($C_1$–$C_4$)alkyl (meth)acrylate copolymer.

32. The film of claim 4 said coupling sequence comprise a linear alternating copolymer of carbon monoxide, ethylene and propylene having a random distribution along the polymer chain of monomer units ethylene (A) and propylene (B), in which the stoichiometric ratio B/A is greater than said ratio B/A in sequence of layers (I).

33. The film of claim 1 wherein said coupling sequence layer contains at least one member selected from the group consisting of polyurethane and polyacrylate.

34. A container closed on all its sides comprising the film of claim 1.

35. In the process of using a form/fill/seal bagging machine the improvement comprising using the film of claim 1.

36. The process of claim 35 wherein said machine is horizontal.

37. A closed container produced by heat sealing a lid film comprising the film of claim 1 with a thermoformed tray film.

38. A sealed container produced by heat sealing a tray film comprising the film of claim 1 with a lid film.

39. Foodstuff packaged in the film of claim 1.

* * * * *